Mar. 27, 1923.

E. GOHIER ET AL.
SPRING CONSTRUCTION FOR AUTOMOBILES.
FILED AUG. 22, 1921.

1,449,988.

Inventors
Elphège Gohier
Albert Lecavalier
By William Clinton
Attorney

Patented Mar. 27, 1923.

1,449,988

UNITED STATES PATENT OFFICE.

ELPHÈGE GOHIER AND ALBERT LECAVALIER, OF ST. MARTIN, QUEBEC, CANADA.

SPRING CONSTRUCTION FOR AUTOMOBILES.

Application filed August 22, 1921. Serial No. 494,182.

*To all whom it may concern:*

Be it known that we, ELPHÈGE GOHIER and ALBERT LECAVALIER, subjects of the King of Great Britain, residing at St. Martin, Province of Quebec, Canada, have invented certain new and useful Improvements in Spring Constructions for Automobiles; and we do hereby declare that the following is a full, clear, and exact description of the invention, such as will enable others skilled in the art to which it appertains to make and use the same.

The present invention relates to new and useful improvements in spring constructions for automobile.

The primary object of the invention is the provision of an auxiliary spring particularly adapted for use in connection with automobile trucks for the purpose of supporting the body in case of an overload, thus permitting an additional weight to be placed within the truck and affording easy riding qualities.

A further object of the invention is the provision of an attachment device whereby the usual springs may be connected to the motor vehicle and also the additional spring which extends at right angles to the usual springs beneath the body for supporting the latter in case of overloading.

A still further object of the invention is the provision of a spring for motor vehicles which will be comparatively simple and inexpensive to manufacture, reliable and efficient in use and readily operated.

With the above and other objects in view, the present invention resides in the novel features of construction, formations, combinations and arrangements of parts to be hereinafter more fullly described, claimed, and illustrated in the accompanying drawing forming a part of the present application and in which:

Figure 1:
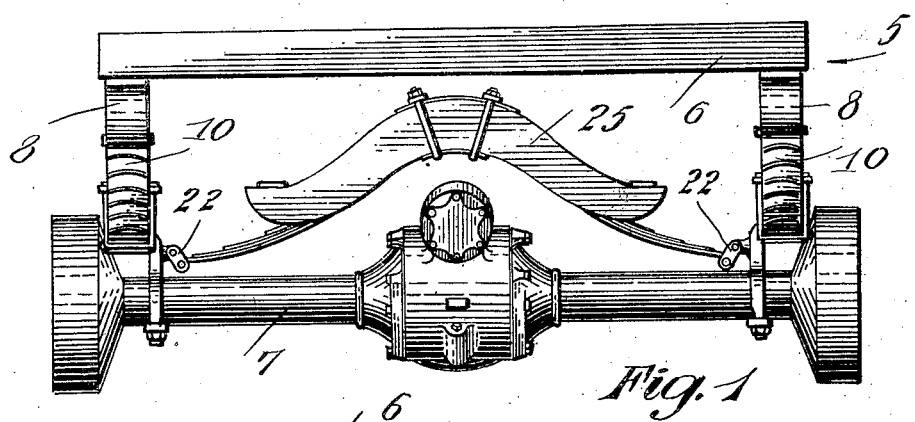
Figure 1 is a rear view of a portion of an automobile chassis showing the invention applied thereto.
Figure 2:
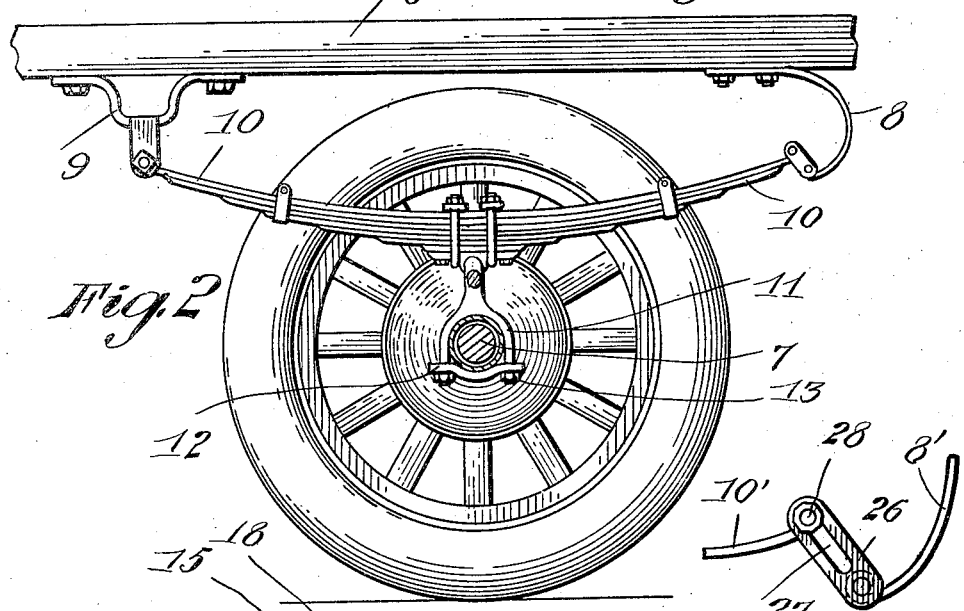
Figure 2 is a longitudinal sectional view thereof.

Referring now to the accompanying drawing by corresponding characters of reference throughout the several views the numeral 5 designates in general a portion of a motor truck including a frame 6 and rear axle 7. A pair of spring hangers 8 and 9 are attached to the opposite sides of the frame 6 and to these said hangers 8 and 9 are connected in the usual manner the main springs 10 of the machine.

U-shaped yokes 11 embrace the axle 7 at the opposite ends thereof and are attached rigidly thereto against displacement by the shackles 12 and nuts 13 which are threaded on the ends of the said U-shaped members 11. These members 11 are provided with upwardly extending heads 14 from which extend outwardly projecting spindles 15 which fit between the saddles 16 upon which the springs 10 rest and the attaching plates 17 in which position they are clamped by the U-bolts 18 which pass around the said springs 10, firmly securing the said springs 10 to the axle.

Inwardly extending members or lugs 19 are provided upon the heads 14 and are formed with transversely disposed sleeves 20 which receive the pivot members 21 of ears 22 to the lower ends of which is pivotally connected as at 23 a supplemental spring 24 which may be of any well known type or design, the upwardly bowed portion of which is encased in the channel member 25 disposed beneath the body of the machine and designed to absorb shock when an overload is placed upon the said body.

Figures 3, 4:
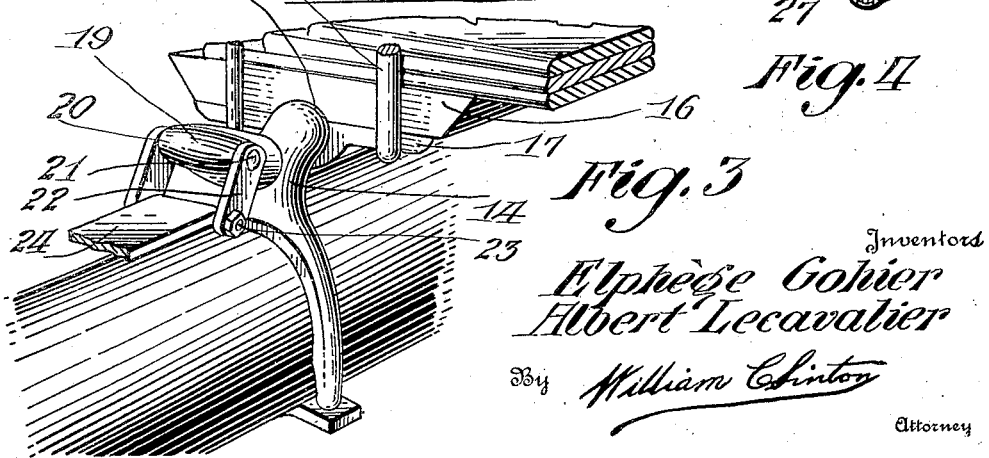
Figure 3 is a sectional perspective view showing the method of attaching the springs to the axle; and, Figure 4 is a detail view showing one means of supporting the main spring.

Referring particularly to Figure 4 of the drawing, a modified form of spring hanger is shown at 8' to which one end of the spring 10' is connected. Straps 26 are pivoted to the lower ends of the hangers 8' and are provided with slots 27 which receive the supporting spring bolts 28, thus allowing a limited movement should occasion necessitate.

From the foregoing description, taken in connection with the accompanying drawing, it will be manifest that a spring construction for motor vehicles is provided, which will fulfill all of the necessary requirements of such a device, and it should be understood in this connection that various minor changes in the specific details of construction can be resorted to within the scope of the appended claims, without departing from the spirit or sacrificing any of the advantages of the invention.

Having thus fully described the invention, what we claim as new and desire to protect by Letters Patent is:—

1. A spring supporting device comprising a yoke for embracing a vehicle axle, a spindle and a lug formed on said yoke and extending in opposite directions, said spindle and lug being adapted for supporting respectively the main spring and supplemental spring of the vehicle.

2. A spring supporting device comprising a yoke for embracing a vehicle axle, a spindle and a lug formed on said yoke and extending in opposite directions, said spindle being adapted to support the main spring of the vehicle, a pair of ears depending from the lug and adapted to support the supplemental spring.

3. In combination with an axle of a vehicle, a yoke embracing said axle, a spindle and a lug formed on said yoke and extending in opposite directions, a main spring supported on said spindle, and a supplemental spring supported by said lug.

4. In combination with an axle of a vehicle, a yoke embracing said axle, a spindle and a lug formed on said yoke and extending substantially parallel with said axle and in opposite directions, a main spring supported on said spindle, and a supplemental spring supported by said lug.

In witness whereof we have hereunto set our hands.

ELPHÈGE GOHIER.
ALBERT LECAVALIER.